Dec. 24, 1968   E. GREGG   3,417,781

QUICK-CONNECT-DISCONNECT COUPLING

Filed July 1, 1965

INVENTOR.
ERIC GREGG
BY Cohn and Powell
ATTORNEY.

United States Patent Office 3,417,781
Patented Dec. 24, 1968

3,417,781
QUICK-CONNECT-DISCONNECT COUPLING
Eric Gregg, St. Louis, Mo., assignor to Stile-Craft Manufacturers, Inc., St. Louis, Mo., a corporation of Missouri
Filed July 1, 1965, Ser. No. 468,739
2 Claims. (Cl. 137—614.04)

ABSTRACT OF THE DISCLOSURE

A coupling having a female member in which the body includes a poppet valve mounted in a socket and provided with a forwardly facing recess, and having a male member in which the plug includes a closed end received in the poppet valve recess and engaging the poppet valve upon insertion. A sealing means is provided between a sleeve movably mounted on the plug and the body forwardly of the valve port and plug port and between the side of the plug end in the poppet recess and the poppet valve at the side of the poppet valve recess rearwardly of the valve port and plug port. A spring is located in a rear recess in the poppet valve and located between the stem fixed in the socket and the poppet valve at the side of the rear recess. A sealing means is provided between the plug and sleeve. The relative size of the effective diameter of the sealing means between the sleeve and body is slightly greater than the sealing means between the plug and poppet valve whereby a slightly unbalanced pressure tends to urge the plug axially outwardly of the socket. This small unbalanced pressure exerts a small axial force between the plug and locking means.

Figure 1:
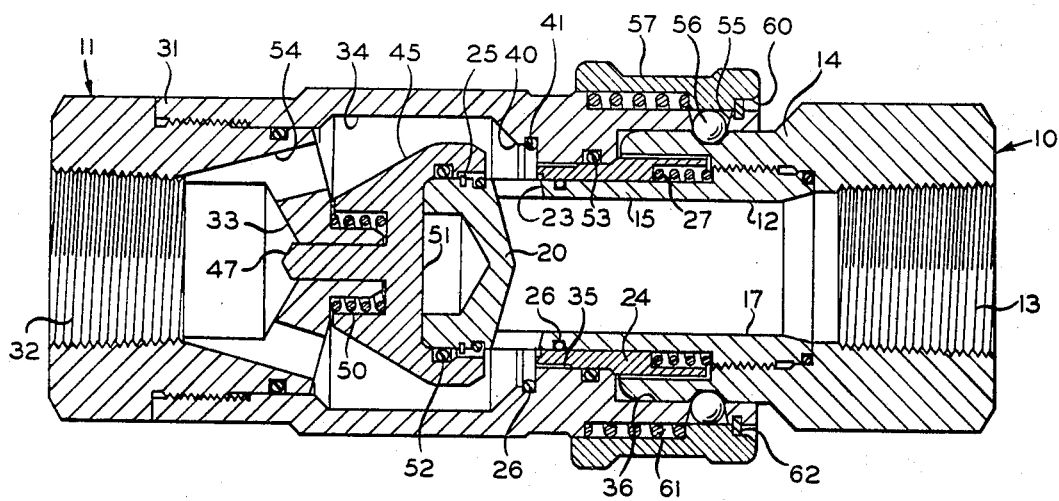

This invention relates generally to improvements in a conduit coupling, and more particularly to an improved quick-connect-disconnect coupling adapted for use in a hydraulic line.

An important object is realized by the provision of a poppet valve mounted in the socket of the female coupling member and urged against a peripheral valve seat defining a valve port, and by the provision of a sleeve movably mounted on the plug of the cooperating male coupling member, the sleeve selectively closing a plug port provided in the plug side and engaging a body shoulder in the socket upon insertion of the plug so as to be moved in a direction to open the plug port, and the plug engaging the poppet valve to open the valve port. When fully inserted, the plug port and valve port are open and in communication for flow therethrough.

Another important objective is achieved in that the poppet valve closes the valve port and the sleeve closes the plug port in such a manner, when the plug is withdrawn, so that there is very little, if any, liquid discharge. This structure provides a "no drip" coupling.

Yet another important object is attained by the structural mounting of the poppet valve and its interconnection with the associated plug end.

Other advantages are provided by the provision of sealing means between the sleeve and body forwardly of the valve port and plug port and sealing means between the plug and poppet valve rearwardly of the valve port and plug port.

An important object is afforded by the structural placement and dimension of the above mentioned sealing means whereby a slightly unbalanced pressure tends to urge the plug outwardly of the socket.

Another important object is realized by the provision of a locking means selectively interconnecting the socket body and the plug which is urged against the plug under the outward force exerted on the plug by the slightly unbalanced pressure on the plug-sealing means. When the locking means includes locking elements interfitting a plug groove and includes an actuating sleeve, this unbalanced pressure tends to urge the plug outwardly of the socket, thereby causing engagement of the plug and locking elements under such small outward force while interconnected to preclude any chatter of or damage to parts incident to any pressure fluctuation, and causing the locking elements to be urged outwardly into frictional engagement with the actuating sleeve with just sufficient force to prevent accidental unlocking movement of the sleeve.

It is an important object to achieve an improved interfitting connection between the plug and socket body, and an improved mounting of a sleeve on the plug adapted to open and close a plug port and adapted to cooperate with an associated body structure for actuation and sealing of the plug sleeve.

An important objective is realized in providing a quick-connect-disconnect coupling that is simple and durable in construction, economical to manufacture and assemble, highly efficient in operation, and which can be readily operated by anyone with little or no instructions.

Figure 2:
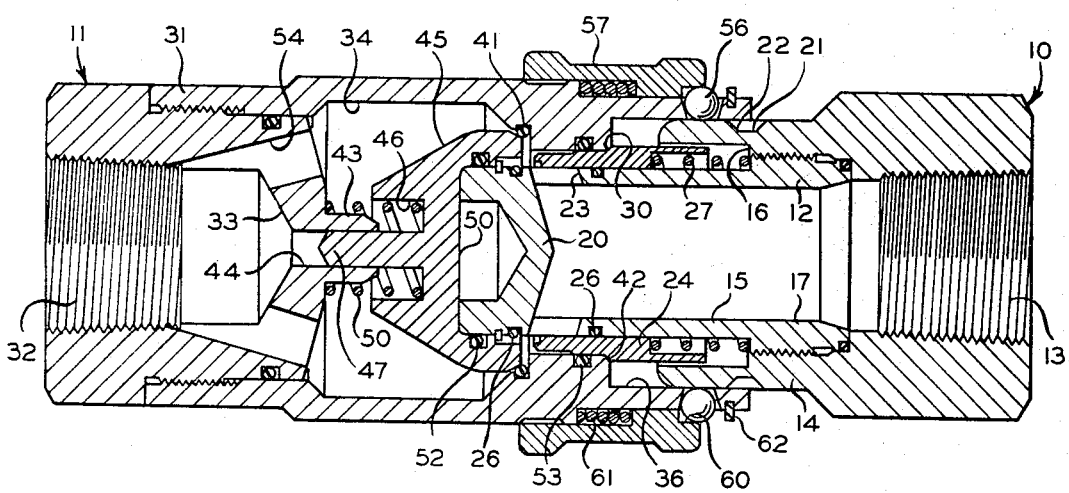

The foregoing and numerous other objects and advantages of the invention will more clearly appear from the following detailed description of a preferred embodiment, particularly when considered in connection with the accompanying drawings, in which:

FIG. 1 is a cross sectional view of the coupling as seen along a vertical plane passed through the longitudinal axis, the plug being fully inserted and latched, and FIG. 2 is a cross sectional view similar to FIG. 1, but illustrating the plug unlatched and partially inserted.

Referring now by characters of reference to the drawings, it will be seen that the quick-connect-disconnect coupling includes a male member generally indicated by 10 and a cooperating female member referred to by 11.

The male member 10 includes a tubular plug 12, the rearmost end 13 of which is internally threaded to receive a fitting (not shown) adapted to connect an associated hose or other similar line of a fluid system. The plug 12 includes an enlarged plug portion 14 and a forwardly extending, relatively reduced plug portion 15. The plug portions 14 and 15 are substantially cylindrical and have an annular recess 16 therebetween, the annular recess having an open end and a closed end. The reduced plug portion 15 includes a longitudinal bore 17 communicating with the threaded end 13. The reduced plug portion 15 includes a closed end wall 20.

An annular groove 21 is provided in the cylindrical, enlarged plug portion 14. The forwardmost margin defining the groove 21 is inclined forwardly to provide a cam shoulder 22.

The reduced plug portion 15 is provided with a plurality of ports 23 (for example, a total of six radially spaced ports can be used) extending through the plug side just behind the closed end wall 20. These side plug ports 23 communicate with the bore 17.

Reciprocatively mounted on the reduced plug portion 15 is a sleeve 24, the sleeve 24 being movable to an extended forward position in which its forward end abuts a lock ring 25, and in which the sleeve 24 closes the plug ports 23. The sleeve 24, in the closed position, engages O-rings 26 disposed forwardly and rearwardly of the plug ports 23 to form an effective seal.

The sleeve 24 is slidably received in the recess 16. A spring 27 is located within recess 16. One end of the spring 27 engages the reduced plug portion 15 and the opposite end engages the sleeve 24, the spring tending to urge the sleeve 24 to its forwardmost position to close the plug ports 23.

For reasons which will best appear upon later description of parts, the sleeve 24 is provided with a forwardly facing abutment 30. In the retracted position of the sleeve 24, as shown in FIG. 1, the spring 27 is compressed and the plug ports 23 are open. The sleeve 24 engages the O-ring 26 located rearwardly of the plug ports 23 to provide a seal between the reduced plug portion 15 and the sleeve 24.

The female member 11 includes a tubular body 31, the rearmost end 32 of which is internally threaded to receive a fitting (not shown) adapted to connect an associated hose or other similar line of a fluid system.

Formed across the body 31 at a distance spaced inwardly from its forward end, is a partition 33 that divides the internal bore to provide a socket generally indicated by 34 forwardly of the partition which is adapted to receive the male member 10.

The body 31 is provided with an internal, peripheral body portion 34 spaced rearwardly of the open body end and forwardly of the partition 33, the peripheral body portion 34 providing a reduced socket portion 35, a relatively enlarged forward socket portion 36 and a relatively enlarged rearward socket portion 37. The peripheral body portion 34 includes a rearwardly facing peripheral valve seat 40 defining a valve port, the valve seat, 40 an O-ring 41 to provide an effective seal. In addition, the peripheral body portion 34 includes a forwardly facing shoulder 42 adapted to engage the sleeve abutment 30 for actuation of the sleeve 24 upon insertion of the plug 12 axially in a direction to open the plug ports 23 and substantially to seat the sleeve 24 against the closed end of recess 16.

Formed integrally with and extending forwardly from the partition 33 is a stem 43 provided with an internal bore 44. A poppet valve 45 is located in the enlarged rearward socket portion 37, the poppet valve 45 including a rearwardly facing recess 46 adapted to receive the partition stem 43 and including a rearwardly projecting finger 47 slidably received in the stem bore 44. A spring 50 is located about the stem 43 and is received in the poppet valve recess 46, one end of the spring 50 engaging the poppet valve 45 and the other end of the spring engaging the partition 33. The spring 50 tends to urge the poppet valve 45 forwardly to engage the valve seat 40 and the associated O-ring 41, and thereby close the valve port.

The poppet valve 45 is provided with a forwardly facing recess 51 adapted to receive and seat the closed end of the reduced plug portion 15. An O-ring 52 is carried by the poppet valve 45 within the recess 51, the O-ring 52 engaging the side of the plug end received in the recess 51 to provide an effective seal therebetween.

The peripheral body portion 34 carries an O-ring 53 that engages the sleeve 24 to provide an effective seal therebetween. When the plug 12 is fully inserted, the O-ring 53 provides such seal forwardly of the valve port defined by the valve seat 40 and forwardly of the plug ports 23.

The O-ring 52 providing the seal between the plug end and the poppet valve 45 is disposed rearwardly of the valve port and plug ports 23.

It will be importantly noted that the O-ring 53 sealingly engages the sleeve 24 on a slightly greater diameter than the diameter of the plug end sealingly engaged by the O-ring 52. Consequently, because of this slight difference in diameters, there is a pressure differential tending to urge the plug 12 outwardly of its compatible socket. The purpose and functional advantages realized by this action will be apparent upon later description of parts.

The partition 33 is provided with a plurality of radially spaced ports 54, the ports 54 placing the flow passage from threaded end 32 in communication with the enlarged rearward socket portion 37 and with the valve port around the poppet valve 45.

The locking means includes a plurality of radially spaced apertures 55 formed peripherally about the body 31 and communicating with the enlarged forward socket portion 36. The apertures 55 are tapered inwardly toward the socket portion 36. Located in each of the apertures 55 is a ball 56 constituting a locking element. The locking balls 56 are adapted to move radially into and out of the enlarged forward socket portion 36. The tapered apertures 55 engage the balls 56 and prevent the balls 56 from falling freely into the socket portion 36.

A sleeve 57 is slidably mounted on the body 31 for reciprocating movement between different positions. The front end of sleeve 57 is provided with a shallow, annular recess 60. The depth of the front recess 60 is sufficient to allow the locking balls 56 to move outwardly of the body 31 to disengage operatively from the enlarged plug portion 14 located in the enlarged forward socket portion 36, when the sleeve 57 is located in its fully retracted position as is illustrated in FIG. 2.

A spring 61 is located between the body 31 and the actuating sleeve 57, the spring 61 tending to urge the sleeve 57 forwardly to the extended position illustrated in FIG. 1 in which the sleeve 57 engages a retaining ring 62. When the sleeve 57 is moved to such extended position, the sleeve 57 cams the locking balls 56 inwardly into the enlarged forward socket portion 36.

It is thought that the operation and functional advantages of the coupling have become fully apparent from the foregoing detailed description of parts, but for completeness of disclosure, the connection and disconnection of the coupling members 10 and 11 will be briefly described.

It will be assumed that the coupling members 10 and 11 are detached. First, the reduced plug portion 15 is inserted into the reduced socket portion 35 and the enlarged plug portion 14 is received in the enlarged forward socket portion 36. To enable a full insertion of the plug 12, the actuating sleeve 57 is fully retracted as is shown in FIG. 2 to permit outward movement of the locking balls 56 and thereby remove any obstruction to the plug 12. As the plug 12 is inserted, the plug sleeve 24 seals with the O-ring 53 and the sleeve abutment 30 engages the body shoulder 42 to cause movement of the sleeve 24 in a direction against the loading of its spring 27 so as to open the side plug ports 23 and substantially to seat the sleeve endwise against the closed end of annular recess 16.

At the same time, the plug end seats in the poppet valve recess 51 and provides a seal with the associated O-ring 52. Upon insertion of the plug 12, the closed end of the reduced plug portion 15 engages the poppet valve 45 and moves the poppet valve 45 rearwardly against the loading of its associated spring 50 so as to disengage the poppet valve 45 from its valve seat 40 and O-ring 41, thereby opening the valve port. When the valve port and the plug ports 23 are open they are directly aligned and adjacent for direct communication to place the enlarged rearward socket portion 37 in direct communication with the plug bore 17.

When the plug 12 is fully inserted, the locking balls 56 are aligned directly with the plug groove 21. The actuating sleeve 57 is moved to its extended position to cam the locking balls 56 inwardly into the plug groove 21. The spring 61 tends to hold the sleeve 57 in its extended position, thereby latching the body 31 to the plug 12, and thereby interconnecting the male and female members 10 and 11.

When utilized in a hydraulic system, there are fluctuations of pressure in the fluid moving through the flow passage. With couplings of different constructions, the plug is urged outwardly under full fluid pressure of large magnitude. Pressure fluctuation with these types of couplings could cause chattering of the plug within the tubular body and cause the locking balls 56 to dent or otherwise damage the plug walls defining the annular locking groove, thereby adversely affecting the locking connection between the coupling members.

It would be possible to have a completely balanced plug so that the plug would be held by the locking balls without any axial pressure therebetween. The fluid pressure and/or fluctuations thereof would not affect the position of the plug and would not cause any chatter. However, because there would be no tight frictional engagement of the locking balls and actuating sleeve as a result of an outward urging of the balls by the plug, the sleeve could be easily retracted accidentally to an unlocked position.

However, because of the small differences in diameter acted on by the sealing O-rings 52 and 53, the resulting small pressure differential tends to urge the plug 12 outwardly and thereby tends to urge the groove shoulder 22 against the locking balls 56 under such outward force.

The small outward, axial force applied to the plug 12 is only of sufficient magnitude so that the groove shoulder 22 urges the balls 56 radially outward into frictional engagement with the sleeve 57 with only enough force whereby the sleeve 57 cannot be accidentally retracted to the unlocked position by striking an object, as the coupling is dragged along the floor for example. Moreover, because the outward axial force applied to the plug is very small, the locking balls 56 will not damage the enlarged plug portion 14 or groove shoulder 22 while seated within the annular groove 21.

To disconnect the male and female coupling members 10 and 11, the actuating sleeve 57 is retracted as is shown in FIG. 2 and the plug 12 is withdrawn. As the plug 12 is withdrawn, the locking balls 56 are urged outwardly of the locking groove 21 to disconnect the tubular body 31 and plug 12. Simultaneously, the poppet valve 45 follows the plug end under the loading of the spring 50 until the poppet valve 45 engages the valve seat 40 and O-ring 41 to close the valve port effectively. At the same time, the plug sleeve 24 is moving forwardly along the reduced plug portion 15 under the action of spring 27 until the end of the sleeve engages the retaining ring 25. In this fully extended position of plug sleeve 24, the sleeve engages the O-rings 26 and closes the plug ports 23. The male member 10 can be completely withdrawn from the female member 11.

Because the valve port defined by the valve seat 40 and O-ring 41 and the side plug ports 23 are closely adjacent and are substantially opened or closed at the same time, there is very little, if any, leakage of liquid from either the tubular body 31 or from the plug 12 upon insertion or withdrawal. It is seen that this structural arrangement provides a "no drip" coupling.

Although the invention has been described by making detailed reference to a single preferred embodiment, such detail is to be understood in an instructive, rather than in any restrictive sense, many variants being possible within the scope of the claims hereunto appended.

I claim as my invention:
1. In a coupling:
(a) a female member including a tubular body providing a socket open at the end,
(b) the body having a peripheral portion extending into the socket to provide a reduced socket portion with an enlarged socket portion forwardly and an enlarged socket portion rearwardly,
(c) the peripheral body portion including a rearwardly facing valve seat defining a valve port and including a forwardly facing shoulder,
(d) a poppet valve mounted in an enlarged rearward socket portion,
(e) means tending to urge the poppet valve against the valve seat to close the valve port,
(f) a male member including a plug having an enlarged portion received in the enlarged forward socket portion, and having a reduced plug portion extending in and through the reduced socket portion and through the valve port when inserted, the reduced plug portion being provided with a port in the plug side,
(g) a sleeve movably mounted on the reduced plug portion,
(h) means tending to urge the sleeve to close the plug port,
(i) the body shoulder engaging the sleeve to move the sleeve in a direction to open the plug port,
(j) the reduced plug portion engaging the poppet valve to move the poppet valve in a direction to open the valve port, the valve port and plug port being in communication when open for flow therethrough,
(k) sealing means between the peripheral body portion and sleeve forwardly of the valve port and plug port and sealing means between the reduced plug portion and poppet valve rearwardly of the valve port and plug port, and sealing means between the plug and sleeve,
(l) the enlarged and reduced plug portions being provided with an annular recess therebetween, the annular having an open end and a closed end,
(m) the sleeve being slidably mounted on the reduced plug portion and received in the annular recess,
(n) a spring mounted in the recess and engaging the sleeve and tending to urge the sleeve to close the plug port, the sleeve being substantially seated against the closed end of the annular recess when the plug port is opened, and
(o) the sealing means between the sleeve and peripheral body portion being on a slightly greater diameter than the sealing means between the reduced plug portion and the poppet valve, whereby a slightly unbalanced pressure tends to urge the plug outwardly of the socket,
(p) the enlarged plug portion including an annular groove,
(q) a plurality of locking elements carried by the body and selectively extending into the enlarged forward socket portion,
(r) an actuating sleeve movably mounted on the body and engageable with the locking elements to urge the locking elements into the plug groove to interconnect the body and plug, and
(s) the slightly unbalanced pressure tending to urge the plug axially outwardly of the socket so that only a small axial force is applied between the plug and locking elements, and so that the locking elements are urged against the actuating sleeve with only enough radial force to prevent accidental movement of the actuating sleeve to an unlocked position.

2. In a coupling:
(a) a female member including a tubular body providing a socket open at the end,
(b) the body having a peripheral portion extending into the socket to provide a reduced socket portion with an enlarged socket portion forwardly and an enlarged socket portion rearwardly,
(c) the peripheral body portion including a rearwardly facing valve seat defining a valve port and including a forwardly facing shoulder,
(d) a partition across the enlarged rearward socket portion,
(e) a stem extending forwardly from the partition, the stem having a bore,
(f) a poppet valve located in the enlarged rearward socket portion, the poppet valve having a rearwardly facing recess in which the stem is received and movable, and having a finger slidably mounted in the stem bore,
(g) a spring in the recess and between the stem and the poppet valve at the side of the rearwardly facing recess, the spring engaging the partition and poppet valve and tending to urge the poppet valve against the valve seat to close the valve port,
(h) the partition being provided with a plurality of ports communicating with the socket around the poppet valve,
(i) a male member including a plug having an enlarged plug portion received in the enlarged forward socket portion and having a reduced plug portion extending in and through the reduced socket portion, the reduced plug portion being provided with a closed end and provided with a port in the plug side, the enlarged and reduced plug portions being provided with an annular recess therebetween, the annular recess having an open end and a closed end, (j) a sleeve slidably mounted on the reduced plug portion and received in the annular recess, (k) a spring in the annular recess and engaging the sleeve tending to move the sleeve in a direction to close the plug port, (l) the body shoulder engaging the sleeve so as to move the sleeve in a direction to open the plug port and substantially to seat the sleeve against the closed end of the annular recess, (m) the poppet valve being provided with a forwardly facing recess receiving the closed plug end, the plug end engaging the poppet valve to move the poppet valve in a direction to open the valve port, the valve port and plug port being in communication when open for flow therethrough, (n) the enlarged plug portion being provided with an annular groove, (o) a plurality of locking elements carried by the body and selectively extending into the enlarged forward socket portion, and (p) an actuating sleeve movably mounted on the body and engageable with the locking elements to urge the locking elements into the plug groove to interconnect the body and plug, and (q) sealing means between the plug sleeve and the peripheral body portion forwardly of the valve port and plug port, and sealing means between the reduced plug portion and poppet valve rearwardly of the valve port and plug port, and sealing means between the plug and sleeve, the sealing means between the plug sleeve and peripheral body portion being on a slightly greater diameter than the sealing means between the reduced plug portion and poppet valve, whereby a slightly unbalanced pressure tends to urge the plug outwardly of the socket so that only a small axial force is applied between the plug and locking elements, and so that the locking elements are urged radially outward by the plug against the actuating sleeve with only enough radial force to prevent accidental movement of the actuating sleeve to an unlocked position.

References Cited

UNITED STATES PATENTS

| 2,485,006 | 10/1949 | Main | 137—614.03 |
| 2,665,928 | 1/1954 | Omon | 137—614.03 |
| 3,039,794 | 6/1962 | Cenzo | 137—614.03 |

FOREIGN PATENTS

| 1,266,400 | 5/1961 | France. |
| 83,236 | 3/1919 | Switzerland. |

WILLIAM F. O'DEA, *Primary Examiner.*

H. COHN, *Assistant Examiner.*

U.S. Cl. X.R.

285—83